UNITED STATES PATENT OFFICE.

FREDERICK P. JENKINS, OF BOSTON, MASSACHUSETTS.

IMPROVEMENT IN SIZING AND DRESSING COTTON.

Specification forming part of Letters Patent No. 194,245, dated August 14, 1877; application filed May 4, 1877.

*To all whom it may concern:*

Be it known that I, FREDERICK P. JENKINS, of Boston, in the county of Suffolk and State of Massachusetts, have invented certain new and useful Improvements in Sizing and Dressing Cotton and other Textile and Fibrous Materials; and I do hereby declare that the following is a full, clear, and exact description thereof, which will enable others skilled in the art to which it appertains to make and use the same.

My invention relates to improvements in sizing and dressing cotton and other textile or fibrous fabrics, paper, &c., for the purpose of producing a better appearance of the fabrics; and this my invention consists in impregnating the fabrics with a mixture of a suitable amount of starch, or its equivalent, and bittern-water, the analysis of which is as follows: About eight per cent. of salt, about two to three per cent. of chloride of potassium, about eight to ten per cent. of chloride of magnesium, and about eight to ten per cent. of chloride of calcium—for producing the desired effect.

The manner in which I carry out my invention is as follows: I mix about one hundred and twenty gallons of common water with about thirty gallons of bittern-water, or a sufficient amount so as to obtain a liquid of about ten to fifteen specific gravity. To this compound is added about forty-five pounds of starch. These proportions may vary as the nature of the material may demand.

The fabrics to be sized and dressed are made to pass through a mixture of the above, by which their appearance is greatly improved.

What I wish to secure by Letters Patent, and claim, is—

1. The herein-described sizing compound, consisting of bittern-water and starch, in or about the proportions as herein set forth.

2. The herein-described process for sizing and dressing cotton and other fabrics by impregnating it with a mixture of bittern-water and starch, or its equivalent, in or about the proportions as herein set forth.

In testimony that I claim the foregoing as my own invention I have affixed my signature in presence of two witnesses.

FREDERICK P. JENKINS.

Witnesses:
 ALBAN ANDRÉN,
 HENRY CHADBOURN.